United States Patent
Schuster

(10) Patent No.: US 10,852,096 B2
(45) Date of Patent: Dec. 1, 2020

(54) PEEP WITH REMOVABLE LENS HOLDING APERTURE

(71) Applicant: Specialty Archery, LLC, Spencer, IA (US)

(72) Inventor: Allan Schuster, Spencer, IA (US)

(73) Assignee: Specialty Archery, LLC, Spencer, IA (US)

( * ) Notice: Subject to any disclaimer, the term of this patent is extended or adjusted under 35 U.S.C. 154(b) by 0 days.

(21) Appl. No.: 16/722,890

(22) Filed: Dec. 20, 2019

(65) Prior Publication Data
US 2020/0217614 A1   Jul. 9, 2020

Related U.S. Application Data

(60) Provisional application No. 62/790,242, filed on Jan. 9, 2019.

(51) Int. Cl.
| | |
|---|---|
| *F41B 5/14* | (2006.01) |
| *F41G 1/467* | (2006.01) |
| *G02B 7/02* | (2006.01) |

(52) U.S. Cl.
CPC ............ *F41B 5/1419* (2013.01); *F41G 1/467* (2013.01); *G02B 7/02* (2013.01)

(58) Field of Classification Search
CPC ............................... F41B 5/1419; F41G 1/467
USPC ........................................ 124/87, 90; 33/265
See application file for complete search history.

(56) References Cited

U.S. PATENT DOCUMENTS

| | | | | |
|---|---|---|---|---|
| 3,302,292 A | * | 2/1967 | Akin, Jr. ................. | F41G 1/467 33/265 |
| 3,410,644 A | * | 11/1968 | McLendon ............. | F41G 1/467 356/247 |
| 3,703,771 A | | 11/1972 | Saunders | |
| 4,116,194 A | | 9/1978 | Topel | |
| 4,552,121 A | | 11/1985 | Treaster | |
| 4,656,747 A | | 4/1987 | Troncoso | |
| 4,833,786 A | * | 5/1989 | Shores, Sr. ............. | F41G 1/467 33/265 |

(Continued)

OTHER PUBLICATIONS

"Hyperopia" definition provided by "Wikipedia, the free encyclopedia" from their internet website "http://en.wikipedia.org/wiki/Hyperopia" printed on Jul. 24, 2005.

*Primary Examiner* — Alexander R Niconovich
(74) *Attorney, Agent, or Firm* — Taft Stettinius & Hollister LLP; Gerald E. Helget

(57) ABSTRACT

Archery bow peep sight for an archery bow string having barrel with an internal hollow passage therethrough. The inner passage has internal front threads, internal rear threads and an intermediate section locking channel. A lens seat with outer annular retainer, a top lens support ring and a frustoconical inner wall is lowered into and locked into the intermediate section locking channel of the barrel. A front peep shade cap with outer threads and a knurled finger grip is threadable into the internal front barrel threads and has a frustoconical inner wall. A rear aperture has outer threads threadable into the internal rear threads of the barrel and a knurled finger grip. The aperture has a frustoconical inner wall and a lower lens cavity whereat a lens is seated. Lowermost flexible lens retainers, that are generally L-shaped, hold the lens within the lens cavity.

7 Claims, 1 Drawing Sheet

(56) References Cited

U.S. PATENT DOCUMENTS

| | | | |
|---|---|---|---|
| 4,961,264 A | 10/1990 | Topel | |
| 4,965,938 A | 10/1990 | Saunders | |
| 5,137,007 A * | 8/1992 | Shoemake | F41G 1/467 |
| | | | 124/87 |
| 5,347,976 A * | 9/1994 | Saunders | F41G 1/467 |
| | | | 124/87 |
| 5,669,146 A * | 9/1997 | Beutler | F41B 5/1419 |
| | | | 33/265 |
| 5,697,357 A * | 12/1997 | Chipman | F41G 1/467 |
| | | | 124/87 |
| 6,058,921 A * | 5/2000 | Lawrence | F41B 5/1419 |
| | | | 124/87 |
| 6,170,164 B1 * | 1/2001 | Knowles | F41G 1/467 |
| | | | 124/87 |
| 6,397,482 B1 | 6/2002 | Chipman | |
| 7,047,652 B1 * | 5/2006 | Chipman | F41G 1/467 |
| | | | 124/87 |
| 7,373,723 B1 * | 5/2008 | Tupper, Jr. | F41G 1/467 |
| | | | 124/87 |
| 7,543,389 B2 * | 6/2009 | Grace, Jr. | F41B 5/1419 |
| | | | 33/265 |
| 8,453,336 B2 * | 6/2013 | LoRocco | F41G 1/467 |
| | | | 33/265 |
| 9,921,033 B2 * | 3/2018 | Johnson | F41G 1/08 |
| 10,012,473 B2 * | 7/2018 | Munsell | F41G 1/01 |
| 10,161,719 B2 * | 12/2018 | Burgaleta Sanchez | |
| | | | F41B 5/1419 |
| 10,228,218 B2 * | 3/2019 | Mason | F41G 1/467 |
| 2005/0088748 A1 * | 4/2005 | Otteman | G02B 27/0018 |
| | | | 359/613 |

* cited by examiner

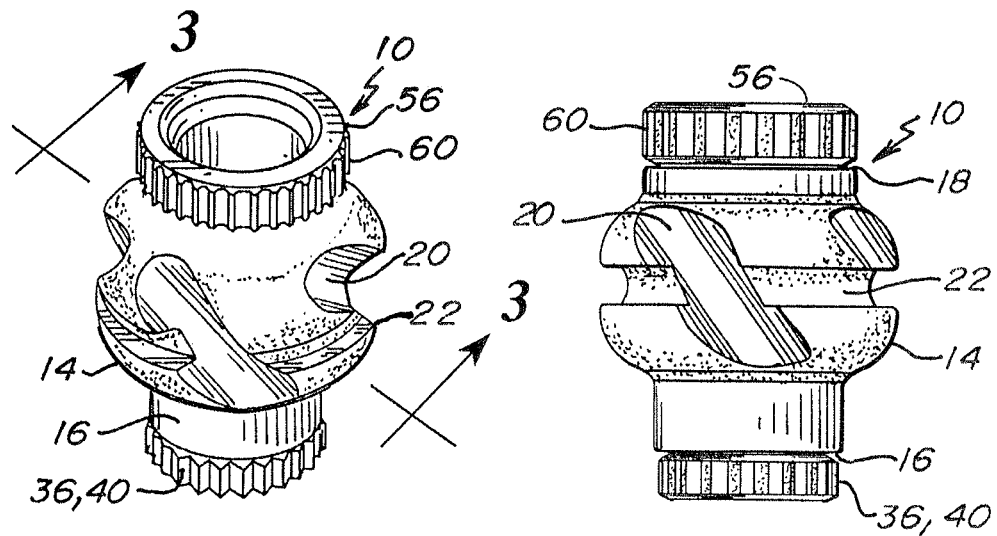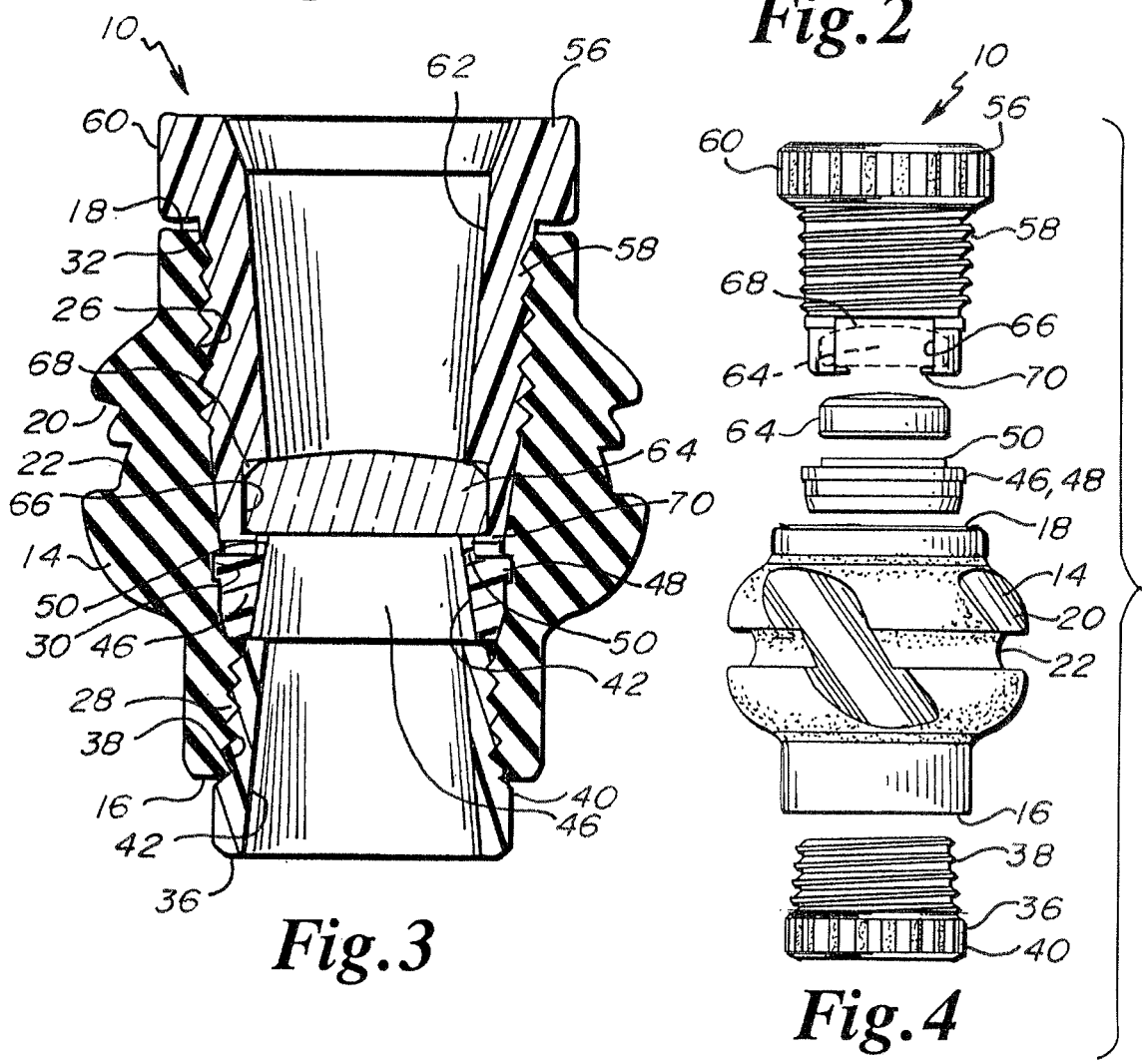

PEEP WITH REMOVABLE LENS HOLDING APERTURE

BACKGROUND OF THE INVENTION

The present invention relates to an archery bow peep sight, and more particularly to a peep sight that releasably holds a lens for an archer that is far sighted, called a clarifier, and will also hold a lens for an archer that is near sighted, called a verifier. The lens may be of a strength particular to the archer.

Peep sights used in archery are well-established aiming devices contributing to the enhancement of the skills of the archer. Peep sights of a general class of the invention are mounted on the bowstring above the nocking point so that upon drawing the bowstring back the archer may align with one eye the small bore of the peep sight with a bow sight pin and a target.

The locating of a target and the sighting on the target through a constricted, small-diameter peep sight is difficult to locate and to orient the peep sight bore in the registry with the intended precise field of interest. Also, even the slightest misalignment of the bore of the peep sight with a line of sight of the archer on the sight pin and target tends to render the effort very difficult to view through the peep sight bore to sight the target.

Farsightedness is a vision problem in which the ability to see objects in the distance is normal, but objects that are close appear blurred. Nearsightedness is a vision problem in which the ability to see objects in the distance appear blurred, but objects that are close appear normal.

Peep sights have been developed to carry a very small lens (0.5 millimeters in diameter) within the peep have been developed. The variety and power of available lens to the archery are quite numerous. Bright surrounding environments and dark surrounding environments may require the interchange of the lens to a different power as the pupil dilates. Changing the lens to a different lens of a different power in the field is most difficult if not impossible to many archers. Lens that are simply held in place by mechanical threads are easy to fall out or be dropped by the archer during a lens change never to be found on the ground full of vegetation, forage or grass. Some lens are mechanically locked into place within the peep requiring significant disassembly of the pieces of the peep.

Lens with a peep sight also are subject to becoming dirty, smeared or filmed-over requiring periodic cleaning even in the field because the peep sight is exposed to all the weather elements while in the field. Here again, disassembly to clean a lens presents the problem of losing the lens or being unable to access the lens without complete disassembly which is not desired in the field as the peep sight is secured to the bow string.

There is a need for an improved archery peep sight that addressed these problems of changing lens and cleaning lens without complete or significant disassembly of the peep sight with the fear of the lens falling out of the peep sight to the ground and becoming lost.

SUMMARY OF THE INVENTION

Archery bow peep sight having barrel with an internal hollow passage therethrough and securable to the bowstring of an archery bow. The inner passage has internal front threads, internal rear threads and an intermediate section locking channel. A front peep shade cap with outer threads and a knurled finger grip is threadable into the internal front barrel threads and has a frustoconical inner wall. A lens seat with outer annular retainer, a top lens support ring and a frustoconical inner wall is lowered into and locked into the intermediate section locking channel of the barrel. A rear aperture has outer threads threadable into the internal rear threads of the barrel and a knurled finger grip. The aperture has a frustoconical inner wall and a lower lens cavity whereat a lens is seated. Lowermost flexible lens retainers, that are generally L-shaped, holds the lens within the lens cavity. The lens is easily removed by using a finger nail or the like to release the lens from the grip of the flexible lens retainers for replacement or cleaning.

A principal object and advantage of the present invention is that the aperture holds onto the lens as the aperture is threadably removed from the peep barrel section for inspection and cleaning.

Another object and advantage of the present invention is that the exposed lens is easily cleaned in its mount within the lens cavity of the aperture.

Another object and advantage of the present invention is that the exposed lens is easily removed, cleaned and/or replaced with a simple deflection of the flexible lens retainers with a finger nail or a small tool.

Another object and advantage of the present invention is that the aperture with the lens may be easily removed from the peep barrel which remains mounted on the bowstring for handling.

Another object and advantage of the present invention is that the lens is protected on both sides by non-metal fixturing to prevent cracking of the lenses.

Another object and advantage of the present invention is that the bow peep sight requires no tools to disassemble and reassemble.

Another object and advantage of the present invention is that the exposed lens is easily removed for cleaning or replacement in its mount within the lens cavity of the aperture.

BRIEF DESCRIPTION OF THE DRAWINGS

FIG. 1 is a top perspective view of the present invention;
FIG. 2 is an elevational view of the invention;
FIG. 3 is a cross sectional view taken along lines 3-3 of FIG. 1; and
FIG. 4 is an exploded elevational view of the present invention.

DETAILED DESCRIPTION

Referring to FIGS. 1 through 4, generally may be seen an archery bow peep sight 10 with lens 64 for nearsightedness or farsightedness that has a plastic barrel 14 that is centrally hollow therethrough. The barrel 10 generally has an internal passage 26 with a front peep cap 36, an intermediate lens seat 46 and a rear aperture 56 with a lens cavity 66 for carrying the lens 64.

Plastic barrel 14 has a front end 16 facing the bow sight and target and a rear end 18 facing the archer's eye. Lateral external grooves 20 are for seating the barrel 14 between a separated section of bow string above the knock which is secured in place by serving string anchored in the string channel 22, as is known. The barrel 14 has an internal passage 26 extending from the front end 16 all the way through to the rear end 18. Within the internal passage 26 are inner front threats 28, an intermediate section locking channel or undercut 30 for a lens seat 46, discussed below, and inner rear threads 32.

Moving within the internal passage 26, the parts within the barrel 14 will be discussed from front end 16 to rear end 18. Plastic front shade peep cap 36 has outer threads 38 for rotatable engagement with inner front threads 28 within internal passage 26 of barrel 14. External knurled finger grip 40 assists in this assembly without any tools. The function of the shade peep cap 36 is to limit bright sun light from entering the internal passage 26.

Lens seat 46 has a lens seat outer annular retainer, lip or rim 48. When the lens seat 46 is inserted into the internal passage 26 from the rear end 18, the retainer 48 snaps into the internal passage's 26 intermediate section locking channel 30 thereby locking the lens seat 46 in place and also on top of the front peep shade cap 36. The lens seat 46 has a top annular support ring 50 further supporting the lens 64 when in place discussed below. Lens seat 46 is also hollow and has a frustoconical inner wall 42.

Plastic rear aperture 56 has outer threads 58 for rotatable engagement with inner rear threads 32 within internal passage 26 of barrel 14. External knurled finger grip 60 assists in this assembly without any tools. The rear aperture 56 has a frustoconical inner wall 62. In the lowermost position of the rear aperture 56 is where lens 64 is situated in lens cavity 66 optionally with head space 68 there above. The bottom of the lens cavity 66 has flexible lens retainers or fingers 70 which are L-shaped in cross section. Flexible lens retainers 70 may be milled out of an inward facing annular lip (not shown). Retainers are easily spreadable with one or two finger nails to remove the lens 64 from the rear aperture 56 for cleaning, replacement, utilization of a different power lens 64 or utilization of a lens 64 with some special light enhancing coating.

The assembly and operation of the archery peep sight 10 with lens 64 may now be appreciated. Initially, the archery bow is placed into a bow press to release bow string tension. The exact location for mounting the peep sight 10 on the bow string is determined and the bow string is parted and barrel is mounted and tied into place on the bow string. Typically the lens seat 46 is already positioned and secured within the locking channel or undercut 30 of the internal passage 26 suitably by the manufacturer or the archer.

The barrel 14 is now positioned on the bow string ready for further assembly. The archer selects the lens 64 type and power appropriate for his or her condition (farsighted or nearsighted). With the rear aperture 56 removed from the barrel 14 by simply turning the knurled finger grip 60, the archer can insert the lens 64 within the lens cavity 66 by simply forcing open the lens retainers 70. Thereafter, the rear aperture 56 is simply threaded into the rear end 18 of the barrel 14. The archer may selectively choose to use the front peep shade cap 36, and if so, simply thread it into the front end 16 of the barrel 14. Thereafter the archer may adjust and practice the sighting in of his bow.

In the field, should the lens 64 become dirty and in need of cleaning, the archer simply removes the rear aperture without fear of the lens 64 falling out of the archery peep sight 10 which remains on the bow string. The archer may try to clean the lens 64 while in place in the lens cavity 66 of the rear aperture as the bottom of the lens is substantially exposed but still captured. The head space 68 above may permit limited access to the top of the lens 64 for cleaning. Alternatively, the archer may simply pry open the lens retainers 70 with a finger nail as to drop the lens out of the aperture 56 into a safely planned secure location for cleaning or replacement.

The above specification and accompanying figures are for illustrative purposes only and the true scope of the present invention is defined by the following claims.

What is claimed:

1. Archery bow peep sight for a bowstring of an archery bow, comprising:
   a) a barrel with a first internal hollow passage therethrough having internal front threads, internal rear threads, an intermediate section locking channel, a front end and a rear end, the barrel adapted to be securable to the bowstring of the archery bow;
   b) a rear aperture with outer threads, an outer finger grip and a second internal hollow passage therethrough securable into the rear end of the first internal hollow passage;
   c) a lower lens cavity within the second internal hollow passage of the rear aperture with at least one lowermost flexible lens retainer; and
   d) a lens adapted to be placed within the lens cavity and removably held in place by the lowermost flexible lens retainer; and
   e) a lens seat with an outer annular retainer lockable into the intermediate section locking channel in the first internal hollow passage of the barrel.

2. The archery bow peep sight of claim 1, further comprising a front peep cap with outer threads and a knurled finger grip threadable into the internal front barrel threads.

3. The archery bow peep sight of claim 1, further comprising a frustoconical inner wall in the front peep cap.

4. The archery bow peep sight of claim 1, further comprising a frustoconical inner wall in the rear aperture.

5. Archery bow peep sight for a bowstring of an archery bow, comprising:
   a) a barrel with a first internal hollow passage therethrough having internal front threads, internal rear threads, an intermediate section locking channel, having a front end and a rear end, the barrel adapted to be securable to the bowstring of the archery bow;
   b) a rear aperture with a second internal hollow passage therethrough, outer threads and a knurled finger grip that is threadable into the internal rear barrel threads securable into the rear end of the first internal hollow passage;
   c) a lower lens cavity within the second internal hollow passage of the rear aperture with at least one lowermost flexible lens retainer;
   d) a lens seat with outer annular retainer lockable into the intermediate section locking channel in the first internal hollow passage of the barrel;
   e) a front peep cap with outer threads and a knurled finger grip threadable into the internal front barrel threads securable into the front end of the first internal hollow passage; and
   e) a lens adapted to be placed within the lens cavity and removably held in place by the lowermost flexible lens retainer.

6. The archery bow peep sight of claim 5, further comprising a frustoconical inner wall in the front peep cap.

7. The archery bow peep sight of claim 5, further comprising a frustoconical inner wall in the rear aperture.

* * * * *